March 17, 1953 H. G. FOOTE ET AL 2,632,060

SOUND RECORDING AND REPRODUCING APPARATUS

Filed Aug. 26, 1946 3 Sheets-Sheet 1

INVENTORS
HAROLD G. FOOTE
WILLIAM J. MORELAND
BY R G Richardson
ATTY

March 17, 1953 H. G. FOOTE ET AL 2,632,060

SOUND RECORDING AND REPRODUCING APPARATUS

Filed Aug. 26, 1946 3 Sheets-Sheet 2

INVENTORS
HAROLD G. FOOTE
WILLIAM J. MORELAND

BY R G Richardson

ATTY.

March 17, 1953 H. G. FOOTE ET AL 2,632,060

SOUND RECORDING AND REPRODUCING APPARATUS

Filed Aug. 26, 1946

3 Sheets-Sheet 3

INVENTORS
HAROLD G. FOOTE
WILLIAM J. MORELAND

BY R. J. Richardson

ATTY

Patented Mar. 17, 1953

2,632,060

UNITED STATES PATENT OFFICE 2,632,060

SOUND RECORDING AND REPRODUCING APPARATUS

Harold G. Foote, Fontana, and William J. Moreland, Delavan, Wis., assignors to The George W. Borg Corporation, Chicago, Ill., a corporation of Delaware Application August 26, 1946, Serial No. 693,064

17 Claims. (Cl. 179—100.2)

The present invention relates in general to sound recording and reproducing apparatus, and more in particular to apparatus of this character in which sound is recorded electro-magnetically on a paramagnetic wire or similar medium.

The object of the invention is to produce a new and improved wire reeling mechanism for a sound recording and reproducing apparatus, more especially for an office dictating and transcribing machine.

A special object is the provision of a small compact reeling mechanism, which is removable as a unit, and is adapted to be transferred back and forth between a dictating or recording machine and a transcribing or reproducing machine.

Other objects are the provision of a new and improved drive mechanism for the wire spools and a new and improved brake mechanism.

The invention and various features thereof will be described more fully hereinafter with reference to the accompanying drawings, in which Fig. 1 is a front view of a sound recording and reproducing apparatus embodying the invention;

Figure 1:
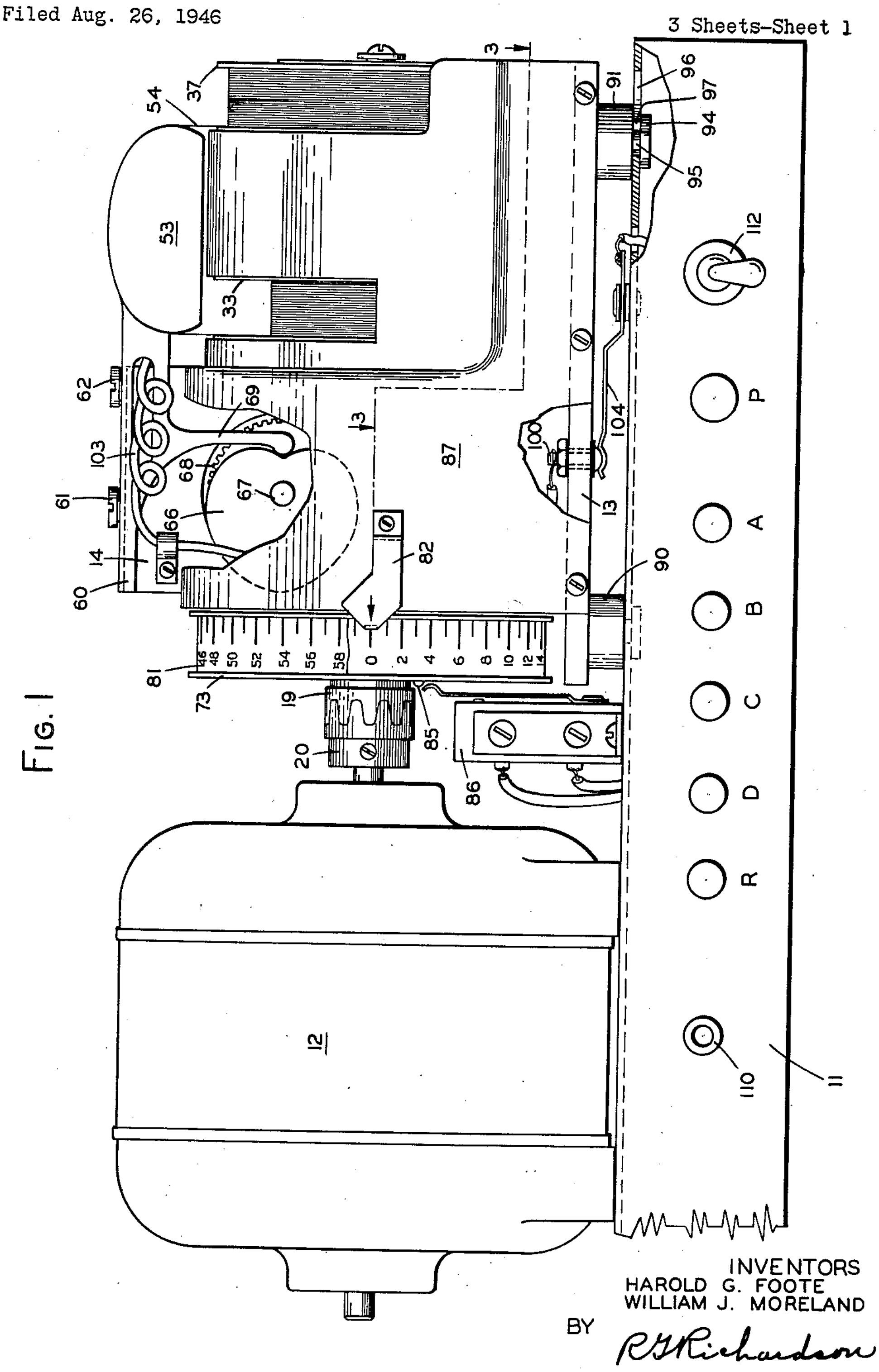
Figures 4, 5:
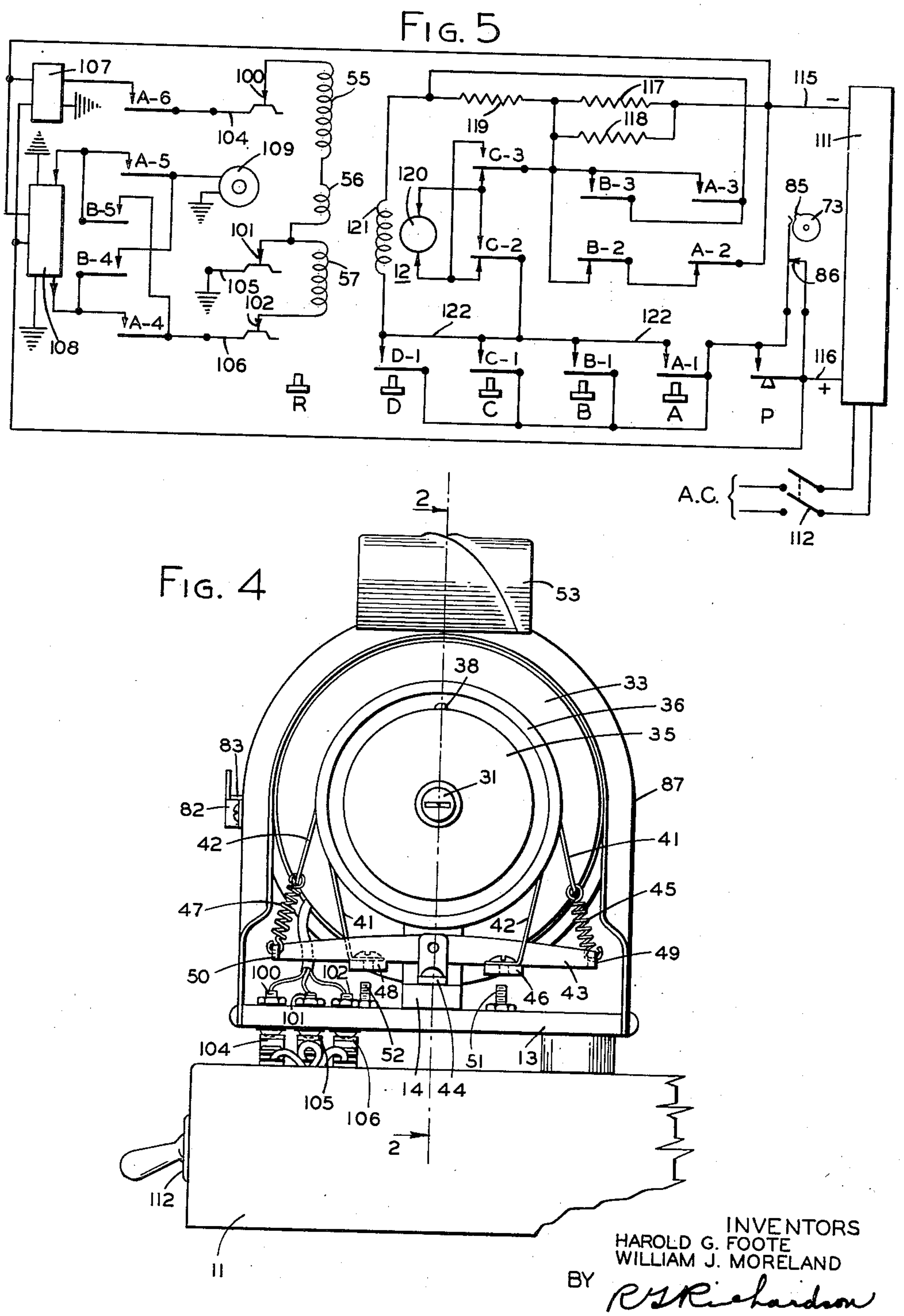
Fig. 4 is an end view of the same, with one of the wire spools removed.
Fig. 5 is a diagrammatic circuit drawing showing the electrical connections.

The complete recording and reproducing apparatus or machine includes a suitable hollow base or chassis 11, which is partly shown in Figs. 1 and 4. The motor 12, which may be a shunt wound direct current motor, is permanently mounted on base 11, as shown in Fig. 1. The wire reeling mechanism shown in Figs. 1 to 4, inclusive, is removably mounted on the base 11 and is automatically coupled to the motor when it is placed in position on the base and uncoupled therefrom when it is removed.

Figure 2:
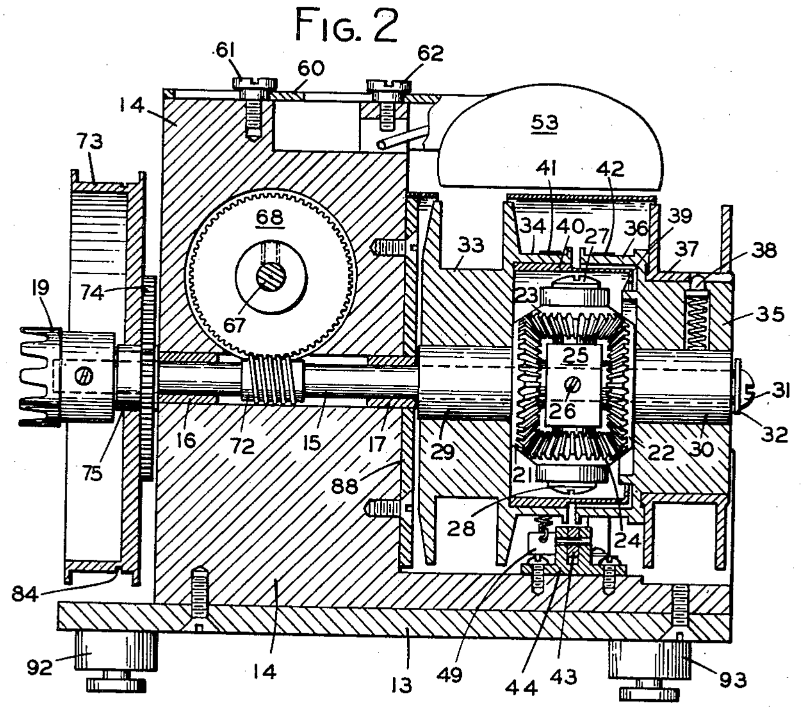
Fig. 2 is a vertical section through the wire reeling mechanism on the line 2—2, Fig. 4.

It will be convenient to first describe the wire reeling mechanism. The various parts of the mechanism are mounted on a frame which comprises the flat horizontal plate 13 and the vertical plate 14, which may be secured to plate 13 by screws, as shown in Fig. 2. The greater part of plate 14 is cut away at the right to provide space for the wire spools.

The shaft 15 is located in an opening which is drilled edgewise through plate 14 and is rotatably supported on the two bearing sleeves or bushings 16 and 17. At its left hand end the shaft 15 is provided with a pronged coupling member 19 which is adapted to engage a similar coupling member 20 on the shaft of the motor 12.

Outside the bearing 17 the shaft 15 carries a differential mechanism comprising the gears 21 and 22 and the pinions 23 and 24. The latter are rotatably mounted on the block 25 by means of the shoulder screws 27 and 28. Block 25 is fixed to the shaft 15 by a set screw 26. The gear 21 is supported on an integrally formed hub 29, which is rotatable on shaft 15. Gear 22 and hub 30 are retained on the shaft by screw 31 and washer 32. Suitable washers may also be interposed between the gears 21 and 22 and the block 25.

The spool 33, having an integrally formed brake drum 34, has a press fit on the hub 29 and rotates with gear 21 of the differential mechanism. Opposite spool 33 there is a hub 35, having an integrally formed brake drum 36. The hub 35 has a press fit on hub 30 and rotates with gear 22. The demountable spool 37 is supported on hub 35 where it is retained by the spring pressed pin or detent 38.

The hub 35 has an annular flange 39 which cooperates with the flanged ring 40 projecting from brake drum 34 to form a housing for the differential mechanism and prevent the loss of lubricant which might otherwise be thrown off through the space between the brake rings 34 and 36.

The brake bands 41 and 42 cooperate with the brake drums 34 and 36, respectively. One end of band 41 is connected by means of spring 45 to arm 49 on the lever 43 and the other end of the band is connected to the arm 48 on lever 43. The other band 42 is similarly connected to arms 50 and 46 of lever 43, the spring 47 being interposed between the band and arm 50. Lever 43 is pivotally mounted on the bracket 44, which may be attached to plate 14 by screws. The brakes are automatically applied and released depending on the direction of rotation of the spools. The springs 45 and 47 are adjusted so that they normally have just enough tension to keep the brake bands taut, so that when the spools and associated brake rings start to rotate some pull will be applied to the brake bands to rotate the lever 43 on its pivot. With this explanation it will be appreciated that when the direction of rotation is counterclockwise as seen in Fig. 4, the lever 43 will be rotated in a counterclockwise direction also and will tighten the band 42 on the brake drum 36. At the same time the lever 43 loosens or releases the band 41. When the direction of spool rotation is clockwise, the lever 43 rotates on its pivot in the same direction, tightens the brake band 41 on brake drum 34, and releases the brake band 42 on brake drum 36. The adjustable stop pins 51 and 52 are provided in order to limit the amount the lever 43 can rotate in either direction, which limits the braking force applied to the desired value.

The recording head may be of the type developed by the Armour Research Foundation, or any other suitable type. It is enclosed in a housing 53 and comprises a core structure having two small air gaps, an erase coil 55, associated with one air gap and a voice coil 57 associated with the other air gap. There is also a small biasing coil 56 connected in series with the erase coil and associated with the voice coil air gap. These coils are shown in the circuit drawing, Fig. 5.

Figure 3:
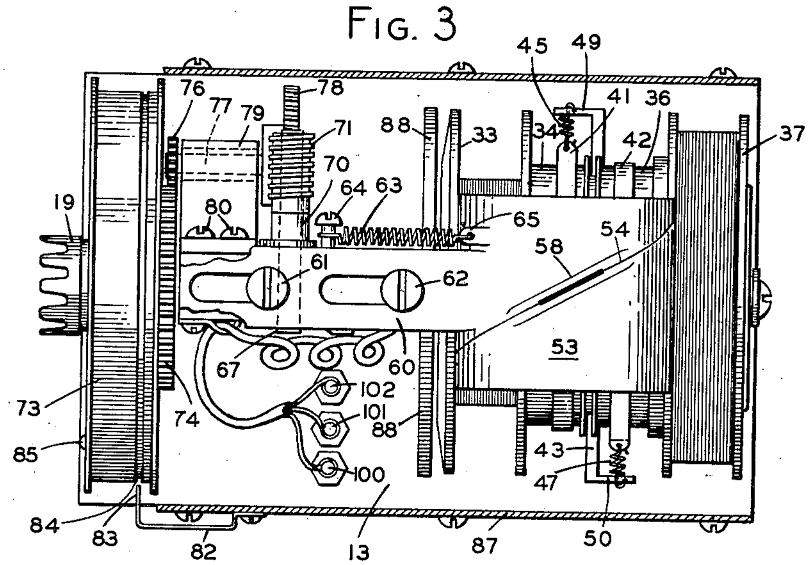
Fig. 3 is a top view of the wire reeling mechanism, the casing being cut away on the line 3—3, Fig. 1.

The wire 54 on which the sound is recorded is carried on the spools 37 and 33 as shown in Figs. 1 and 3. The ends of the wire are secured to the spools in any suitable manner, as by means of leaders such as disclosed in our pending application, Serial No. 678,570, filed June 22, 1946. The wire 54 passes from spool 37 into a spiral groove 58 in the upper wall of the housing 53 and rides over the housing in this groove down on to the spool 33. The recording head is so located in the housing 53 that the air gaps in the magnetic structure are properly related to the path of the wire in the groove 58. In the ordinary use of the apparatus the wire 54 is never entirely unwound from either spool but remains attached to both spools. Spool 33, for example, contains a small variable amount of wire which is inactive and ordinarily will not be rewound on to spool 37. This will be explained more fully in the course of the explanation of the operation of the apparatus.

The housing 53 is supported on a slotted member 60 which fits over the top of plate 14, where it is held by the shoulder screws 61 and 62. The member 60 is slidable on plate 14 and is urged to its left hand position by the spring 63, which is tensioned between a screw 64 threaded into the plate 14 and an ear 65 attached to the housing 53. The movement of member 60 and housing 53 to the right is brought about by the heart shaped cam 66 which cooperates with an arm 69 extending downward from member 60. These parts can be seen in Fig. 1.

The cam 66 lies just outside the frame plate 14. The gear 68 is located in a circular recess in the plate. The cam and gear are rigidly mounted on the shaft 67, which is rotatably supported by means of the flanged bearing sleeve 70. This sleeve is pressed into an opening in frame plate 14 which is concentric with the recess in which gear 68 is located, and is shown in Fig. 3. Outside the bearing sleeve there is a worm 71 which is fixed to shaft 67 and which forms part of the indicator drive as will presently be explained. The shaft 67 is driven by the worm 72, Fig. 2, which is fixed to shaft 15 and is in engagement with gear 68.

The mechanism just described is commonly known as a level wind mechanism and its function is to traverse the wire 54 back and forth along the spools as it is wound from one spool to the other.

The indicator mechanism includes a flanged drum or spool 73 which has a press fit on the hub 75 of gear 74. The gear is rotatably supported on an extension of the bearing sleeve 16, as can be seen from Fig. 2, and is driven by the pinion 76 on shaft 77. The shaft 77 is rotatably supported on a bracket 79, Fig. 3, which is secured to the frame plate 14 by means of screws 80, and is driven by means of the gear 78 and worm 71. The latter is on shaft 67, which is driven from shaft 15 by the worm 72 and gear 68, as previously explained. The gear ratio depends on the amount of active wire carried on the spools 33 and 37. Assuming that these spools carry enough wire for about one hour's continuous dictation, the gear ratio will be such that the drum 73 makes one complete rotation in one hour, when the shaft 15 is rotated at recording speed, or 240 R. P. M.

The reference character 81, Fig. 1, indicates a strip of paper, having a scale calibrated in minutes of dictating time. The length of the strip is substantially equal to the circumference of the drum 73 and its width is slightly greater than the distance between the flanges, so that when the strip is wrapped around the drum it will stay in place.

The strip 81 may be marked at the beginning of each letter by means of a resilient member 82, secured to the casing 87, and provided with a rearwardly extending arm 83 the end of which is aligned with the groove 84 in the surface of drum 73. By pressing on member 82 the arm 83 is moved into groove 84 and the strip is marked by the resulting perforation.

At the end of the indicator drum 73 there is a cam 85, seen in Figs. 1 and 3. This cam operates the micro-switch 86, mounted on the base 11, to stop the machine shortly before the wire available for recording becomes exhausted, or in somewhat less than one hour's elapsed dictation time.

The wire reeling mechanism may be provided with a casing 87, which is shown clearly in Figs. 1, 3 and 4. The casing is secured to the base plate 13 of the unit by means of screws as shown and the rounded upper part of the casing is supported on the disc 38 which is secured to the frame plate 14. This disc prevents any lateral displacement of the upper part of the casing and maintains clearance between the interior thereof and the spools 33 and 37. The casing is cut away in the vicinity of the spools so as to provide access thereto. Spool 37 may be removed through the open right hand end of the casing, if it should become necessary, and may be replaced by another spool of wire. The end of the wire can be readily attached and started on to spool 33, which is sufficiently accessible for this purpose.

The wire reeling mechanism may be removably mounted on the base 11 in any suitable manner. As shown it is provided with four supports 90 to 93, inclusive, which interlock with the top of the base. This construction may be described in connection with the support 91, Fig. 1, from which it will be seen that the support includes a head 94 and a shank 95 by means of which the head is joined to the main body of the support. The top of the base has an opening thereing shaped like a keyhole, comprising a circular opening 96 slightly larger than the head 94 and an intersecting slot 97 the width of which is slightly greater than the diameter of the shank 95. The other three supports are the same and are associated with similar openings in the top of the base. It will be appreciated that the described arrangement secures the unit firmly to the base and at the same time enables it to be removed readily, which is accomplished by sliding the unit to the right until the heads such as 94 become aligned with the openings such as 96 and then lifting it up to cause the heads to pass through these openings. The unit is assembled to the base by reversing these operations, that is, by lowering the unit on to the base with the heads such as 94 aligned with the openings such as 96, so that the heads will pass through the openings, and by then sliding the unit to the left to cause the shanks such as 95 to enter into the slots such as 97.

The sliding movement of the unit to the right or left which is involved in removing or replacing the unit causes the coupling member 19 to disengage or engage the coupling member 20, as the case may be, whereby the shaft 15 is uncoupled from or coupled to the shaft of the motor 12.

The sliding movement of the unit also disconnects or connects the coils in the recording head. These coils are wired to the terminals 100, 101 and 102 by means of shielded conductors in the cable 103. The terminals 100, 101 and 102 are mounted on the frame plate 13 and cooperate with the contact spring 104, 105 and 106, respectively, mounted on the base 11, when the unit is in assembled position as shown in Fig. 1. The contact springs have curved ends to fit the ends of the terminals and preferably are made of heavier stock than would otherwise be necessary, whereby they function to retain the unit in position.

A number of the parts mentioned in the preceding description are shown diagrammatically in the circuit drawing, Fig. 5. Other items which are shown will be described briefly.

The rectangle 107 represents an oscillator which may be of any suitable type, having an output frequency which is well above the audible range. The frequency may be 30,000 cycles per second, for example. An amplifier is represented by the rectangle 108 and also may be of any suitable and known type, adapted to amplify currents of audio frequency. The component parts of the oscillator and amplifier may be mounted on the base 11 according to the usual practice.

The reference character 109 indicates a so-called microphone which should be of the dynamic type capable of operating both as a transmitter and a receiver. The microphone is preferably connected to the base or chassis 11 by means of a plug ending flexible cord. A jack 110, Fig. 1, may be provided to receive the plug.

A number of manually operable keys A to D, inclusive, and R are shown in Fig. 5 and also in Fig. 1. Keys A to D, inclusive, are of the locking type and are mechanically interconnected in such a manner that any key, when actuated, will release any key previously actuated. Key R is a release key, adapted to unlock and release any key in the group. The reference character P indicates a push button, which can be operated to short circuit the contacts of the micro-switch 86.

Direct current may be supplied to the motor 12, the oscillator 107, and the amplifier 108 by the rectifier 111, to which commercial alternating current may be supplied through the main switch 112.

The operation of the machine when used as an office dictating machine will not be explained. It may be assumed for this purpose that the machine is in the condition in which it is shown in Fig. 1, with the bulk of the wire 54 wound on spool 37 and a fresh strip of paper 81 on the drum 73. The main switch 112 should be closed, to supply current to the rectifier 111.

Being ready to proceed, the operator actuates key A, which locks in operated position. At contact A–5, key A connects the microphone 109 to the input side of the amplifier 108 and at contact A–4, key A connects the output of the amplifier to the voice coil 57. At contact A–6, key A connects the oscillator 107 to the erase coil 55. These switching operations place the apparatus in condition for recording.

The operation of key A also closes a circuit for the armature of motor 12 which can be traced from the negative bus or conductor 115 by way of resistors 117 and 118 in parallel (contact A–2 being now open), contact C–3, armature 120, contact C–2, conductor 122, contact A–1, and micro-switch 86 to the positive conductor 116. Current flow over the above circuit energizes the armature of the motor. The field 121 of the motor is energized by current flow over a similar circuit extending from negative conductor 115 by way of resistances 117 and 118 in parallel, contact A–3, field winding 121, conductor 122, contact A–1, and micro-switch 86 to the positive conductor 116, whereby the field winding is effectively connected in shunt of the armature.

The motor 12 now starts to run at the slow forward speed, approximately 240 R. P. M., which is the proper speed for recording, and drives the shaft 15 by means of the coupling 19—20. The direction of rotation is counter-clockwise as seen from the right in Fig. 1. The block 25, fixed to shaft 15, drives the spools 33 and 37 by means of the differential mechanism and the wire 54 is moved past the recording head by winding it on to spool 33 and unwinding it from spool 37. At the same time the level wind mechanism is driven from shaft 15 and the housing 53 is reciprocated back and forth to distribute the wire uniformly on spool 33.

The operator may now start dictating, speaking into the microphone 109. In moving past the recording head the wire 54 first passes the air gap with which the erase coil 55 is associated and since this coil is now supplied with high frequency current from the oscillator 107 any existing record on the wire is wiped out. Voice currents generated in the microphone in response to dictation are amplified by the amplifier 108 and are transmitted to the voice coil 57, whereby the spoken words are recorded on the wire as it passes the air gap with which the voice coil is associated. These operations are known and will require no further explanation.

It will be convenient now to explain the operation of the differential drive more in detail. When the shaft 15 starts rotation the block 25 carrying the pinions 23 and 24 starts to rotate the gears 21 and 22 simultaneously and the spools 33 and 37 with the associated brake drums 34 and 36 likewise start to rotate simultaneously. The brake bands 41 and 42 rotate the lever 43 in response to the initial rotation of the brake drums, until the arm 48 on the lever comes into engagement with the stop 52. This rotation of lever 43 tightens the brake band 42 on drum 36 and loosens or releases the brake band 41 on drum 34. The spool 37 now slows down slightly, responsive to the braking action at drum 36, and the differential mechanism accelerates the spool 33, thereby placing tension on the wire 54. During the further rotation of the spools by the differential mechanism which takes place the braking action is overcome partly by power applied through gear 22 to drum 36 and partly by the pull on wire 54, produced by power applied to spool 33 through gear 21. The wire 54 is thus maintained under tension as it is wound from spool 37 on to spool 33.

With the spools shown, the wire speed is substantially constant, assuming that the speed of the motor 12 is constant, but since most of the wire is contained on spool 37 it will be evident that spool 33 will have to rotate faster than spool 37 in order to maintain the wire under tension. The spools are rotated at the proper relative speeds by the differential mechanism, in response to the braking action at drum 36, which tends to cause spool 37 to lag behind. As the wire is transferred to spool 33 the difference in the speeds of the two spools becomes less and the speeds become equal when half of the wire has been transferred, that is when the diameter of the mass of wire on spool 33 is the same as the diameter of the mass of wire on spool 37. At this time the pinions 23 and 24 of the differential mechanism do not rotate. As the operation proceeds, and the amount of wire on spool 33 becomes greater than the amount of wire on spool 37 the pinions start to rotate in the opposite direction and spool 37 rotates at a greater speed than spool 33.

It will be understood that the wire tension can be adjusted by adjusting the stop pin 52 up or down. The position of this pin determines the amount of tension that is developed in spring 47 when lever 43 is rotated responsive to initiation of the drive.

Whenever the operator desires to stop dictating he can stop the machine by momentarily actuating the release key R. The operation of this key releases key A and thereby restores the circuits to normal condition. The machine is started again when dictation is to be resumed by again operating key A.

In the event that the operator desires to play back part of the record, it will be necessary to rewind that portion of the wire which contains such part of the record. The rewinding operation is initiated by operating key C.

When key C is operated the key locks in operated position and unlocks any other key, key A, for example, which may be in operated position at the time. Key C also closes a circuit for the armature of the motor 12 which extends from the negative conductor 115 by way of contact A–2, contact B–2, actuated contact C–3, armature 120, actuated contact C–2, contact C–1, and micro-switch 86 to the positive conductor 116. This circuit differs from the previously described armature circuit completed by key A in that the connections to the armature are reversed at contacts C–3 and C–2 and in that the resistors 117 and 118 are short circuited by the chain circuit through contacts B–2 and A–2. Key C also closes the circuit of the field winding 121 over a path which now includes the resistor 119, contacts B–3 and A–3 being open.

The motor 12 now starts to run in the opposite direction from the direction in which it ran before and rotates the spools 33 and 37 in a clockwise direction as seen from the right in Fig. 1, thereby rewinding the wire 54 from spool 33 to spool 37. When the spools start to rotate the brake lever 43 rotates also until the arm 46 engages the stop pin 51, with the result that the brake band 41 is tightened on drum 34 while the brake band 42 on drum 36 is released. The differential mechanism accordingly operates as before to rotate the spools at the proper relative speeds to maintain the wire under tension between the spools. The amount of tension may be adjusted by means of the stop pin 51 and is not necessarily the same as the tension employed during recording.

During the rewinding operation the motor 12 runs at high speed, which may be six or more times the recording speed, for example, and consequently the wire which has to be rewound is quickly transferred to spool 37. The operator then stops the operation by actuating the release key R, or by actuating key B if the record is to be immediately reproduced.

Assuming that the operator desires to reproduce the record on the rewound portion of the wire, he will actuate key B which locks in operated position and releases key C, if not already released by means of key R. Key B closes circuits for the motor 12 which are similar to the motor circuits completed by key A and previously described, whereupon the motor resumes the slow forward drive, rotating the spools 33 and 37 in a counter-clockwise direction the same as during the previous recording operation. Key B also connects the voice coil 57 to the input side of the amplifier 108 at contact B–5 and at contact B–4 connects the output side of the amplifier to the microphone 109.

As the wire moves past the recording head with the foregoing circuits conditions obtaining, voice currents corresponding to the record on the wire are generated in the voice coil 57. These currents are amplified by the amplifier 108 and are transmitted to the microphone 109, which now operates as a receiver to translate the voice currents into audible speech.

After listening to the reproduction the operator can stop the machine by operating key R, or he can place the machine in recording condition by operating key A, and may then resume dictation. If part of the record is to be erased the key A is operated just before the part to be erased is reached during the reproduction.

Upon finishing each letter the operator may mark the calibrated paper strip 81 by momentarily depressing the resilient member 82, whereby a hole is punched in the strip. It is not necessary to stop the machine for this operation since the drum 73 rotates very slowly.

The operator may continue dictation as described in the foregoing, starting and stopping the machine at will, playing back or erasing parts of the record, until the wire on spool 37 approaches exhaustion. As mentioned before, the spool may contain at the start sufficient wire for about an hour's continuous dictation. As the wire is wound from spool 37 to spool 33 the drum 73 is rotated by the driving means previously described and eventually the cam 85 will engage the operating lever of the micro-switch 86 and open the switch, thus stopping the machine.

The operator may now release key A by operating key R and remove the wire reeling unit from the base 11, replacing it with another unit. The machine is now in condition for further recording, whenever the operator is ready to proceed.

The unit which was removed from the machine is delivered to a transcribing operator or typist, who may be provided with a machine which is the same as the machine described, except that a head phone is preferably substituted for the microphone 109. It may be assumed, therefore, for the purpose of explaining the operations performed by the transcribing operator, that the machine shown herein is now a transcribing machine rather than a recording machine.

When the unit is received by the transcribing operator she will place it in position on the machine in the manner described, and will then operate the rewind key C. When the unit is placed on the machine the cam 85 will open the micro-switch 86, and accordingly the machine will now start in response to the operation of key C. The operator, therefore, operates the push button P, which short circuits the micro-switch, and holds the push button depressed until the rewinding operation has proceeded far enough to close the micro-switch. The rewinding operation continues until the cam 85 again opens the micro-switch 86. The wire 54 has now been rewound from spool 33 to spool 37.

The transcribing operator will now operate key B, which locks and releases key C, and will use the push button P again to start the slow forward drive and continue it until the micro-switch 86 is closed. As the drive continues from this point the beginning of the dictation will shortly be heard in the head phone and the ensuing reproduction is copied off in the usual manner. The transcribing operator can stop the machine at will by means of the release key R and she can repeat any desired part of the reproduction by means of the rewind key C, as will readily be understood.

A fast forward drive is provided and may be used by the transcribing operator to quickly bring any desired part of the record into position for reproduction. The fast forward drive is initiated by operation of key D, which completes circuits for the motor 12 which are the same as those completed by key C, except that the connections to the armature 120 are not reversed.

When the reproduction of the record is finished the cam 85 will open the micro-switch 86 again to stop the machine. The transcribing operator will now proceed to rewind the wire again by operating key C and using the push button P as before. Upon completion of the rewinding operation the machine is again stopped automatically by the micro-switch. The transcribing operator may now operate key B and start the slow forward drive by means of push button P, continuing the drive until the micro-switch has closed, whereupon key B is released.

A fresh strip of paper may now be placed on the drum 73, and the unit may be removed from the transcribing machine and returned to the vicinity of the recording machine, where it is ready for use as previously explained.

The invention having been described, that which is believed to be new and for which the protection of Letters Patent is desired will be pointed out in the appended claims.

We claim:

1. A wire reeling mechanism for a sound recording or reproducing apparatus, comprising a frame, a shaft rotatably mounted on said frame, two wire carrying spools supported on said shaft, an indicator drum supported for rotation on the same axis as said spools, means on said shaft for rotating said spools to wind said wire from one spool to the other, and means comprising speed reducing gears for causing said shaft to rotate said drum at a speed bearing such a predetermined relation to the speed of said spools that said drum makes a single rotation while the said spools make the number of rotations necessary to wind said wire as set forth.

2. In a wire reeling mechanism for a sound recording or reproducing apparatus, two wire carrying spools supported side by side on the same axis, means for rotating said spools, two brake drums secured to said spools, respectively, a pivoted lever, and two brake bands passing around said drums, respectively, and means connecting both ends of each brake band to said lever, the ends of each band being connected to said lever on opposite sides of its pivot and the connections of said bands to said lever being so located with reference to the pivot thereof that movement of the lever in one direction will tighten the first band and loosen the second whereas movement of said lever in the other direction will tighten the second band and loosen the first.

3. A wire reeling mechanism as claimed in claim 2, wherein each complete band includes a resilient section, and adjustable stops are provided to limit the movement of the lever in each direction.

4. In a sound recording or reproducing apparatus, a wire or similar record medium, a recording or reproducing device, means including two spools for moving said wire past said device by winding it from one spool to the other, a motor for rotating said spools, a switch for closing the circuit of said motor, a second switch actuated automatically responsive to transfer of a predetermined amount of wire to open the circuit of said motor, a rotatable cam geared to said spools for actuating said second switch, and a third switch manually operable at will to close a shunt around said second switch.

5. A wire reeling mechanism for a sound recording or reproducing apparatus, comprising a frame, a shaft rotatably mounted in said frame, two wire carrying spools rotatably supported on said shaft, an indicator drum rotatably supported on said shaft, differential mechanism including a part fixed on said shaft for rotating said spools to wind a predetermined usable portion of said wire from one spool to the other, and means comprising speed reducing gears connecting said shaft and drum and responsive to the rotation of the shaft in effecting the transfer of said usable portion of wire to cause not more than one rotation of said drum.

6. A wire reeling mechanism for a wire recorder, comprising a frame, a shaft rotatably mounted in said frame, two wire carrying spools and an indicator rotatably mounted on said shaft and adapted to rotate at different speeds, differential mechanism driven by said shaft for rotating said spools to transfer a working length of wire from one spool to the other, and gears driving said indicator from said shaft at a speed such that its angular position at any instant during the transfer of said wire corresponds to the amount of wire transferred.

7. A detachable reeling unit for a sound recording and reproducing apparatus having a motor and electrical circuit elements, said unit comprising a frame, a shaft rotatably mounted on said frame, an electromagnetic transducer, two spools carrying a record medium, differential mechanism including gears connected to said spools and a part driven by said shaft for rotating said spools to move said record medium past said transducer, means for effecting a mechanical connection between said shaft and said motor responsive to movement of the unit during its assembly to said apparatus, and means also responsive to said movement for connecting said transducer to said circuit elements.

8. In a reeling mechanism for a sound recording or reproducing apparatus, two spools for carrying a record medium, means supporting said spools for rotation on a common axis, two brake drums secured to said spools, respectively, two brake bands on said drums, respectively, said bands being normally in frictional engagement with their respective drums, and means operated by the pull on one band responsive to rotation of its associated drum and spool for reducing the friction between the other band and its associated drum, said means comprising a pivoted lever having oppositely extending lever arms connected to opposite ends, respectively, of each brake band.

9. In a reeling mechanism for a sound recording or reproducing apparatus, two spools for carrying a record medium, means supporting said spools for rotation on a common axis, two brake drums secured to said spools, respectively, two brake bands on said drums, respectively, said bands being in frictional engagement with their respective drums when said drums are not rotating, and means operated by the pull on one band responsive to rotation of its associated drum and spool for tightening said band on its drum and for simultaneously loosening the other band on its drum, said means comprising a pivoted lever having oppositely extending lever arms connected to opposite ends, respectively, of each brake band.

10. In a reeling mechanism as claimed in claim 9, adjustable means for limiting the tightening and loosening operations, 11. In a reeling mechanism for a sound recording or reproducing apparatus, two spools for carrying a record medium, means supporting said spools for rotation on a common axis, two brake drums secured to said spools, respectively, two brake bands on said drums, respectively, a pivoted lever, connections between said lever and the two ends of each brake band, the connections of each band being made to said lever on opposite sides of its pivot and at different distances therefrom, and two springs included in said connections for normally maintaining said bands in frictional engagement with their respective drums.

12. A mechanism for reeling a wire or similar sound record medium, comprising a frame, a shaft rotatably mounted in said frame, two wire carrying tools rotatably supported on said shaft in spaced relation to each other, a differential mechanism including a pinion supporting member fixed on said shaft between said spools, means for rotating said shaft to cause said differential mechanism to rotate said spools in the same direction to wind said wire from one spool to the other, and means for guiding said wire diagonally across said shaft from the spool from which it is being taken off to the spool on which it is being wound.

13. A reeling mechanism as claimed in claim 12, including means geared to said shaft to give said guiding means a reciprocating motion in a direction parallel to said shaft to distribute the wire on the spool on which it is being wound.

14. A mechanism for reeling a wire or similar sound record medium, comprising a frame, a shaft rotatably mounted in said frame and projecting therefrom, a differential mechanism comprising two gears rotatably mounted on the projecting portion of said shaft, a member fixed to said shaft between said gears, and a pinion rotatably supported on said member in engagement with said gears, a spool fixed to the gear nearest said frame, a hub fixed to the outer gear, a spool removably mounted on said hub, means for rotating said shaft to cause said differential mechanism to rotate said spools in the same direction, thereby to wind said wire from one spool to the other, and means supporting said wire between said spools to pass the wire across said shaft and differential mechanism.

15. A reeling mechanism as claimed in claim 14, including a brake drum fixed to the first mentioned spool, a brake drum fixed to the hub on which the second spool is mounted, and brake bands cooperating with said drums.

16. A reeling mechanism as claimed in claim 15, wherein the brake drums extend toward each other in directions parallel to the shaft and form an enclosure for the differential mechanism.

17. In a reeling mechanism, two spools for carrying a record medium, means supporting said spools for rotation, means for rotating either spool to wind said record medium thereon and to unwind it from the other spool, two brake drums operatively connected to said spools respectively, two brake bands on said drums, respectively, said bands being in light frictional engagement with their respective drums when said spools are not rotating, a lever having a pivot at a point intermediate its ends, forming two lever arms extending in different directions from said pivot, connections from the ends of the first brake band to the end of the first lever arm and to an intermediate point on the second lever arm, respectively, and connections from the ends of the second brake band to the end of the second lever arm and to an intermediate point on the first lever arm.

HAROLD G. FOOTE.
WILLIAM J. MORELAND.

REFERENCES CITED

The following references are of record in the file of this patent:

UNITED STATES PATENTS

| Number | Name | Date |
|---|---|---|
| 789,336 | Poulsen | May 9, 1905 |
| 895,547 | Ferro | Aug. 11, 1908 |
| 947,148 | Browne | Jan. 18, 1910 |
| 951,711 | Westcott | Mar. 8, 1910 |
| 1,123,147 | Sherman | Dec. 29, 1914 |
| 1,142,384 | Tiffany | June 8, 1915 |
| 1,210,955 | Longheck | Jan. 2, 1917 |
| 1,215,364 | Gilmore | Feb. 13, 1917 |
| 1,237,496 | Fankhauser | Aug. 21, 1917 |
| 1,326,997 | Vebelmesser | Jan. 6, 1920 |
| 1,499,521 | Hagermann | July 1, 1924 |
| 1,786,917 | Oehmichen | Dec. 30, 1930 |
| 1,834,407 | La Grande | Dec. 1, 1931 |
| 2,012,208 | Wildy | Aug. 20, 1935 |
| 2,017,855 | Foster | Oct. 22, 1935 |
| 2,062,016 | Serrurier | Nov. 24, 1936 |
| 2,097,592 | Gibbs | Nov. 2, 1937 |
| 2,153,666 | Hill et al. | Apr. 11, 1939 |
| 2,257,424 | Meyer | Sept. 30, 1941 |
| 2,275,961 | Heller | Mar. 10, 1942 |
| 2,289,555 | Simons | July 14, 1942 |
| 2,321,780 | Tondeur | June 15, 1943 |
| 2,321,812 | Heller | June 15, 1943 |
| 2,328,055 | Clough | Aug. 31, 1943 |
| 2,338,991 | Arnold | Jan. 11, 1944 |
| 2,349,018 | Tasker | May 16, 1944 |
| 2,356,145 | Begun | Apr. 22, 1944 |
| 2,364,556 | Somers | Dec. 5, 1944 |
| 2,419,476 | Begun | Apr. 22, 1947 |
| 2,424,498 | Nygaard | July 22, 1947 |
| 2,477,146 | Scherbatskoy | July 26, 1949 |
| 2,507,385 | Shrader | May 9, 1950 |
| 2,535,478 | Arndt, Jr. et al. | Dec. 26, 1950 |

FOREIGN PATENTS

| Number | Country | Date |
|---|---|---|
| 424,924 | Great Britain | Mar. 4, 1935 |